United States Patent
Won et al.

(10) Patent No.: US 12,332,886 B2
(45) Date of Patent: Jun. 17, 2025

(54) PERFORMANCE OPTIMIZED PIPELINED EXECUTION FOR FEDERATED DATABASES

(71) Applicant: SAP SE, Walldorf (DE)

(72) Inventors: Jeong Hee Won, Seoul (KR); Hyeong Seog Kim, Yongin-si (KR)

(73) Assignee: SAP SE, Walldorf (DE)

( * ) Notice: Subject to any disclaimer, the term of this patent is extended or adjusted under 35 U.S.C. 154(b) by 103 days.

(21) Appl. No.: 17/821,283

(22) Filed: Aug. 22, 2022

(65) Prior Publication Data

US 2024/0061837 A1  Feb. 22, 2024

(51) Int. Cl.
G06F 16/2453  (2019.01)
G06F 16/25  (2019.01)

(52) U.S. Cl.
CPC ...... G06F 16/24539 (2019.01); G06F 16/256 (2019.01)

(58) Field of Classification Search
CPC ... G06F 16/24539; G06F 16/256; G06F 16/27
See application file for complete search history.

(56) References Cited

U.S. PATENT DOCUMENTS

| | | | | |
|---|---|---|---|---|
| 2015/0193514 A1* | 7/2015 | Bradshaw | ............ | G06F 16/178 |
| | | | | 707/638 |
| 2017/0126779 A1* | 5/2017 | Dong | ............ | H04L 67/568 |
| 2018/0165324 A1* | 6/2018 | Krishnaswamy | ... | G06F 11/1471 |
| 2020/0117497 A1* | 4/2020 | Franciosi | ............ | G06F 3/067 |
| 2021/0248071 A1* | 8/2021 | Jung | ............ | G06F 16/2386 |
| 2021/0311839 A1* | 10/2021 | Kumarasamy | ...... | G06F 16/1827 |
| 2022/0091742 A1* | 3/2022 | Littlefield | ............ | G06F 3/0619 |
| 2023/0185671 A1* | 6/2023 | Vig | ............ | G06F 16/2477 |
| | | | | 707/649 |

* cited by examiner

*Primary Examiner* — Cam Y T Truong
(74) *Attorney, Agent, or Firm* — Mintz Levin Cohn Ferris Glovsky and Popeo, P.C.

(57) ABSTRACT

In some implementations, there is provided a method including receiving a request to provide a local database system with smart data access to a database table stored at a remote database system; executing, by the local database system, a series of one or more fetches, each of which obtains a chunk of the database table stored at the remote database system, such that a corresponding result set for each fetch causes the remote database system to fetch and materialize a corresponding chunk of the database table rather than the database table in its entirety; and reading, by the local database system, a first chunk obtained from the database table stored at the remote database system to form, at least in part, the local copy at the local database system.

18 Claims, 5 Drawing Sheets

PERFORMANCE OPTIMIZED PIPELINED EXECUTION FOR FEDERATED DATABASES

TECHNICAL FIELD

This disclosure relates generally a database management system and, in particular, pipelined execution of fetches.

BACKGROUND

Database management systems have become an integral part of many computer systems. For example, some systems handle hundreds if not thousands of transactions per second (which in-turn can generate over time a large volume of corresponding data). On the other hand, some systems perform very complex multidimensional analysis on data. In both cases, the underlying database may need to handle responses to queries very quickly in order to satisfy systems requirements with respect to transaction time. Given the complexity of these queries and/or their volume, the underlying databases face challenges in order to optimize performance including use of resources, such as memory and storage.

SUMMARY

In some implementations, there is provided a computer-implemented method including receiving a request to provide a local database system with smart data access to a database table stored at a remote database system, such that smart data access provides the local database system with a local copy of the database table stored at the remote database system; in response to receiving the request, executing, by the local database system, a series of one or more fetches, each of which obtains a chunk of the database table stored at the remote database system, such that a corresponding result set for each fetch causes the remote database system to fetch and materialize a corresponding chunk of the database table rather than the database table in its entirety; and in response to a first fetch in the series of one or more fetches, reading, by the local database system, a first chunk obtained from the database table stored at the remote database system to form, at least in part, the local copy at the local database system.

In some variations, one or more of the features disclosed herein including the following features can optionally be included in any feasible combination. The computer-implemented method may further include providing, by the local database system, metadata to the remote database system, wherein the metadata indicates at least a maximum size of the chunk to be obtained from the database table stored at the remote database system. The computer-implemented method may further include in response to a second fetch in the series of one or more fetches, reading, by the local database system, a second chunk obtained from the database table stored at the remote database system to form, at least in part, the local copy at the local database system. The computer-implemented method may further include checking, by the local database system, whether the remote database system supports pipelined fetches. In response to the remote database system supporting the pipelined fetches, the local database system executes the series of one or more fetches. The local database system includes a federated query executor and the remote database system includes a federated query handler, the federated query executor and the federated query hander working together to execute the series of one or more fetches. The computer-implemented method may further include receiving, by the federated query executor, an indication from a cursor function at the federated query handler, the indication providing an amount remaining in the database table to be fetched via the corresponding chunks. Each of the one or more fetches is configured to have a size below a threshold size. The threshold size is configured by the local database system as part of a procedure to execute at the remote database system the series of one or more fetches. The local database system and the remote database system are each an in-memory database that materialize a corresponding chunk of the database table rather than the database table in its entirety.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

A database system may persist some of its data in various remote data stores. For example, an in-memory database may store a portion of its data remotely in a remote database or a cloud store. However, this use of remote storage may cause performance delays associated with accessing the data. To reduce the data access delays, the in-memory database in this example may virtualize a portion of the remote data at the database (so the data is available locally at the in-memory database). For example, a database table stored at a remote data store may be copied into a local database table of the in-memory database, so the local system of the in-memory database may have a local, virtual version (or copy) of what is stored at the remote data store. This copy into the local database table can be performed with for example an INSERT INTO LOCAL_TABLE SELECT*FROM VIRTUAL_TABLE. As such, this local, virtual copy of the database table may provide the in-memory database with smart data access in the form of a local database table that provides a virtual version (or copy) of the database table stored at the remote data store. By providing the local, virtualized database table, the in-memory database in this example may have much faster access to the local, virtualized database table, when compared to accessing the database table at the remote data store.

However, an issue with this smart data access is that the remote data store may materialize the entire database table in order to provide the database table to the local system (or in-memory database). In order to respond to a query from the in-memory database for the VIRTUAL_TABLE for example, the remote data store may materialize the entire VIRTUAL_TABLE. This full materialization of the VIRTUAL_TABLE may consume a large amount of resources (e.g., memory, processing, and/or network) at the remote data store. And, in the case that the remote data store is also an in-memory database (or some other data store where memory is constrained or a premium resource), the full materialization of the database table can be considered a problem.

In some embodiments, there is provided a way to reduce the resources needs for materializing the table. In some embodiments, a local system obtains a local copy of a database table (which is stored remotely at a remote system) by using a pipelined execution of partial fetches of the database table, such that the remote system does not need to materialize the entire database table. Alternatively, or additionally, the pipelining may also reduce the need for the local system to fully materialize a database table as the data of that table is provided in so-called chunks (which reduces the local systems need to fully materialize the database table).

Before providing additional details regarding pipelined execution of partial fetches, the following provides an example of a system environment.

Figure 1:
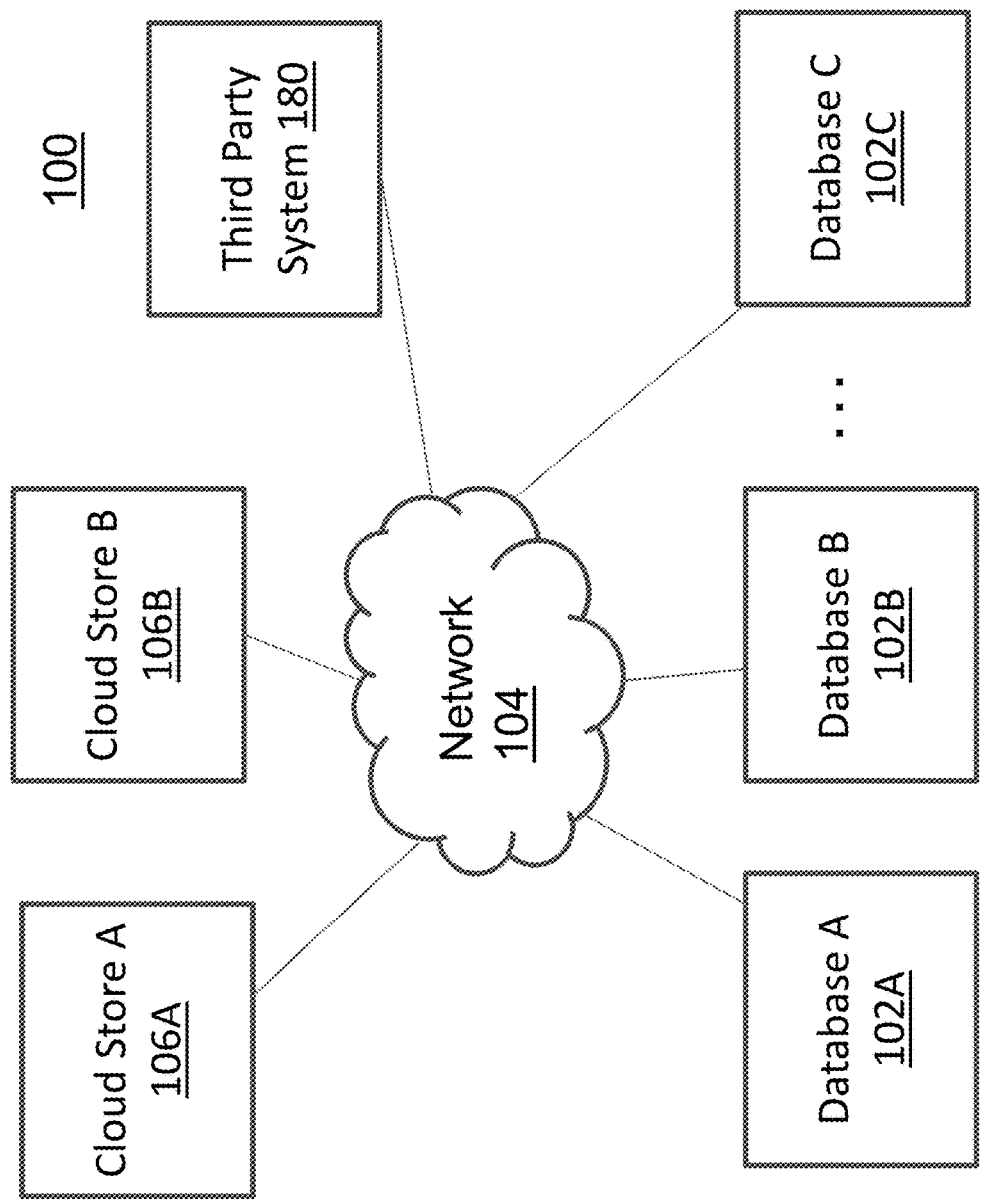
FIG. 1 depicts a block diagram of an example of a system environment, in accordance with some embodiments.

FIG. 1 depicts a block diagram depicting an example of a system 100 including a plurality of database management systems, such as a first database management system (labeled "Database A") 102A, a second database management system (labeled "Database B") 102B, a third database management system (labeled "Database C") 102C, a first cloud store (labeled "Cloud Store A") 106A, a second cloud store (labeled "Cloud Store B"), in accordance with some embodiments. The components 102A-C and the cloud store 106A-B may be coupled via at least network 104 (e.g., the Internet). Moreover, although FIG. 1 depicts a certain quantity of components (e.g., 102A-C and 106A-B), other quantities of each component may be realized as well.

In operations, an end-user (e.g., a customer) may access, via for example the third party system 180, a database 102A-C and/or a cloud store 106A-B via for example a software as a service (SaaS), platform as a service (PaaS), and/or or infrastructure as a service (IaaS) arrangement. When this is the case, these systems may provide service(s) to the end user as well as other end users. To illustrate further, an end user may, via for example the third party system 180 (e.g., a client device including an application such as a browser or other type of application), access and interact with components 102A-C and/or 106A-B.

The databases 102A-C may rely on the same or different storage or database technology. For example, the database 102A may be an online transaction processing (OLTP) system using a relational database system. An example of an OLTP system is the SAP S/4HANA™ enterprise resource planning (ERP) system. Furthermore, the databases may operate using for example the same or different storage technology, such as a row-oriented database system, a column-oriented database system, or a hybrid row-column store approach. Alternatively, or additionally, the database 102B may be for example an online analytic processing (OLAP) system using the same or different storage technology as the database 102A. Applications of OLAP systems include business reporting for sales, marketing, management reporting, business process management (BPM), budgeting, forecasting, financial reporting, and/or other types of analytics. An example of the OLAP system 104 is the SAP BW/4HANA™ data warehouse solution, which can be used to for example answer multi-dimensional analytical (MDA) queries.

The cloud stores 106A-B may be used to store the data processed by the database systems 102A-C. Examples of the cloud stores 106A-B include SAP™ data centers, Microsoft Azure™ data centers, Amazon Web Services™ data centers, Alibaba Cloud™ data centers, Google Cloud Platform™ data centers, a private data center, and/or the like.

To illustrate further, a first database, such as the database 102A, may have at least a portion of its data stored at another database (and/or cloud store), such as the database 102B. In this example, the databases 102A-B are both in-memory databases, although the databases may operate using other storage technologies as well. The database 102A may want smart data access to a database table X stored at the database 102B. In this example, smart data access refers to the database 102A storing a copy of the database table X locally at the database 102A, such that the local copy represents a virtualized copy of the database table X (which is persisted at database 102B). To provide the smart data access to database table X, the database table is materialized both locally (e.g., at database 102A) and remotely (e.g., at database 102B), which causes as noted a high demand for the use of memory and other resources. The term materialized refers to the table being processed (e.g., queried, scanned/read, cached in memory for transport, and/or the like).

In some embodiments, there is provided a pipelined execution of partial fetches to obtain a portion (e.g., chunks) of a database table stored at a remote system, such that the remote system does not need to materialize fully the entire database table. For example, a local system, such as an in-memory database, may seek smart data access for a database table X that is stored at a remote system, such as another in-memory database. In this example, the local system obtains a virtual, local copy of the database table using N (e.g., multiple) fetches, wherein each fetch is a "partial" fetch that obtains an increment or chunk of the database table. This pipelined fetch approach may thus reduce the need for at least the remote system to fully materialize the entire database table as the remote system only has to materialize a "chunk" (e.g., portion) of the database table in order to respond to each fetch from the local system. Alternatively, or additionally, the pipelined fetch can reduce the need for the local system to materialize the entire database table by instead handling only the "chunk(s)." With for example, INSERT INTO LOCAL_TABLE SELECT*FROM VIRTUAL_TABLE, the query consists of two operators: fetch of the remote VIRTUAL_TABLE into the local system and insert the fetched VIRTUAL_TABLE data into LOCAL_TABLE. Here, the smart data access works for the first operator and executes "SELECT*FROM REMOTE_SYSTEM.VIRTUAL_TABLE" from the remote system. By supporting local pipelined fetch as well, the pair of operator 1 and 2 is executed multiple times to fetch and insert a chunk of the table instead of having just a single fetch and insert for the entire table. Pipelined thus refers to the fetches being a series of fetches (which may or may not overlap in time).

Figure 2:
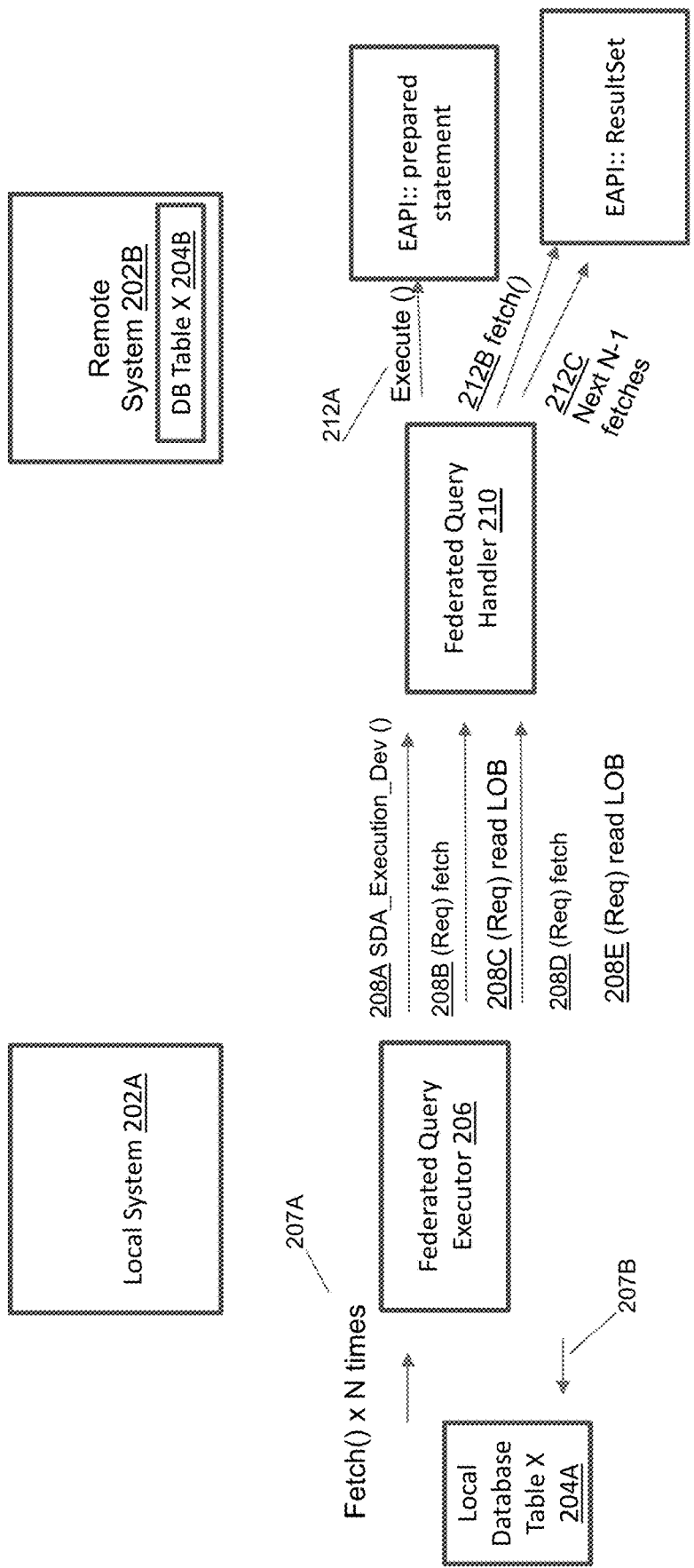
FIG. 2 depicts an example of pipelined partial fetches between a local system and a remote system, in accordance with some embodiment.

FIG. 2 depicts a local system 202A and a remote system 202B, in accordance with some embodiments. In the example of FIG. 2, the local system 202A may correspond to the database A 102A (which may comprise an in in-memory database) and the remote system 202B may correspond to the database B 102B (which may also comprise an in in-memory database). Although this example describes the use of in-memory databases, other types of database technologies may be used as well.

In the example of FIG. 2, the local system 202A may have at least a portion of its data remotely stored at one or more other systems, such as at the remote system 202B. For example, the local system 202A may persist its database table X 204B at the remote system 202B. To improve access to database table X 204B, the local system 202A may enable smart data access by initiating the creation of a local, virtual database table 204A that is a copy of the database table X 204B, such that the local system 202A does not need to access (e.g., via network 104) the remotely stored database table X 204B.

To provide this smart data access, the local system 202A may perform a plurality of N (e.g., multiple) fetches 207A toward the remote system 202B to obtain chunks (e.g., portions) of the database table X 204B, such that each of the plurality of fetches causes the remote system to materialize only a chunk of database table X 204B (rather than the entire database table X 204B) in order to respond to a given fetch. After the plurality of N (e.g., multiple) fetches have been performed, the local system 202A has the local, virtualized database table X 204A that is a copy of the database table X 204B, providing thus smart data access to the database table X.

In some embodiments, the local system 202A and remote system 202B both must allow (or enable) support for smart data access and, in particular, the pipelined fetches (or so-called "partial fetches") to obtain the database table for the smart data access. For example, the local system 202A may check whether the remote system 202B allows or supports the pipelined fetches (or so-called "partial fetches") for the smart data access.

Referring to FIG. 2, the local system 202A may include a federated query executor 206, while the remote system 202B includes a federated query handler 210. The query executor 206 and query handler 210 are federated in the sense that that these two components 206/210 operate collectively to provide the pipelined fetches for the smart data access disclosed herein.

In some embodiments, the federated query executor 206 executes the pipelined fetches from the local system 202A to the remote system 202B. In some respects, the federated query executor hides the underlying specific database table transfer mode being used, such as row-wise result set fetch, a binary transfer, a universal internal table, and/or the pipelined universal internal table, which is in accordance with some embodiments.

In operation, the local system 202A may perform N (e.g., multiple) fetch( ) calls 207A towards remote system 202B, wherein each of the fetches have a fetch size. This fetch size may be configured to be below a threshold size. In this example, the Federated Query Executor 206 may return at 207B a chunk (e.g., portion) of a database table that is less than or equal to the fetch size, which can be specified in terms of quantity of rows or other values (e.g., memory size, quantity of columns, etc.). In response to the fetch N times operation 207A, the Federated Query Executor's opens a procedure 208A (labeled SDA_EXECUTION_DEV( )) that controls execution at the remote system 202B via the Federated Query Handler 210.

For example, for a given query to obtain database table X 204B for smart data access, there may be several executions of fetches, but for a first fetch the Federated Query Executor 206 may open a result set and return (from the remote system 202B) a partial chunk of database table X 204B, while subsequent fetches continue and return partial chunks by accessing the opened result set. As each chunk materializes the result set partially at the remote system 202B, the result set consumes much less memory, when compared to materializing the entire table all at once.

In the example of FIG. 2, the procedure 208A may have as a first parameter indicating the size of the CLOB (character large object). This first parameter may indicate the maximum size of a chunk (or each chunk) to be fetched in a given fetch.

For this first execution of the procedure 208A, this causes federated query handler 210 to execute (or perform) the first execution 212A at the remote system 202B. The first execution 212A corresponds to a prepared statement (or operation) for the remote query (which is opened via an embedded API (EAPI)) that partially materializes a chunk of the result set for database table X. In response to the first fetch request 208B and the execute 212A, a first partial fetch 212B obtains a partial result set (which is a chunk of the database table X 204B at the remote system) to the embedded API: result set. At the remote system 202B, the partial result set (which is a chunk of the database table X 204B at the remote system) is materialized (e.g., read from the database table X 204B and cached for reading) and serialized as a large object (LOB), so that the Federated Query Executor 206 can read 208C the LOB.

In response to the second fetch request 208D, a second partial fetch 212C obtains another partial result set (which is another chunk of the database table X at the remote system), which is materialized and serialized as another large object (LOB) and then read by the Federated Query Executor 206 at 208E. Although FIG. 2 shows a certain quantity of fetches, there can be other quantities of fetches sufficient to copy the database table X 204B into local database table X 204A.

In the example of FIG. 2, the remote system 202B only has to materialize a chunk or portion of the database table X 204B for each fetch. In other words, the entire database table X 204B at the remote system 202B is not materialized, but instead only the portion requested by a partial fetch is materialized—saving thus memory consumption at the remote system. Alternatively, or additionally, the pipelining may also reduce the need for the local system to fully materialize a database table as the data of that table is provided in so-called chunks (which reduces the local systems need to fully materialize the database table).

In some embodiments, the Federated Query Handler 210 may include a cursor function, which tracks the state of the pipelined fetches to copy the database table X 204B into local database table X 204A. For example, the Federated Query Handler may receive size of chunks and size of packets carrying the chunks, and this information can allow the Federated Query Handler 210 to determine (and/or track) the state of the pipelined fetches (e.g., whether the partial fetches have completely copied the database table or how many fetches remain until the partial fetches have completely copied the database table). Alternatively, or additionally, the Federated Query Handler's cursor function sends information regarding whether the cursor has any left rows or data left (e.g., amount remaining in table or a flag to indicate whether or not there are rows or data remaining in the table) back to Federation Query Executor, when returning the fetch result.

The result set sharing over multiple SDA_EXECUTION_DEV( ) may be considered an asynchronous execution framework. From a local system perspective, the first procedure (e.g., SDA_EXECUTION_DEV( )) opens a nested statement with a holdable cursor over commit property. As the nested statement belongs to a corresponding parent SDA_EXECUTION_DEV( ) procedure, the corresponding parent SDA_EXECUTION_DEV( ) procedure is required to keep the corresponding federated cursor (which is at the remote system) for subsequent SDA_EXECUTION_DEV( ) to enable reuse within the nested statement. If an auto commit is configured (e.g., "on"), a commit is executed after a statement execution, so setting holdable cursor over the commit property is required for the nested statement to avoid being closed by the commit. The subsequent SDA_EXECUTION_DEV( ) may be executed by the same transaction. When Auto Commit (which is a connection property defined when defining a remote source) is on, the execution of SDA_EXECUTION_DEV( ) is followed by a transaction commit. All the open cursors are closed when a transaction is committed. As there is a need to reuse the asynchronous cursor from the subsequent SDA_EXECUTION_DEV( ), the cursor should have a "hold over commit" property. With this property, the cursor is kept even after a transaction commit. Auto commit mode refers to when a statement is completed, the method commit is called on that statement automatically.

Figure 3:
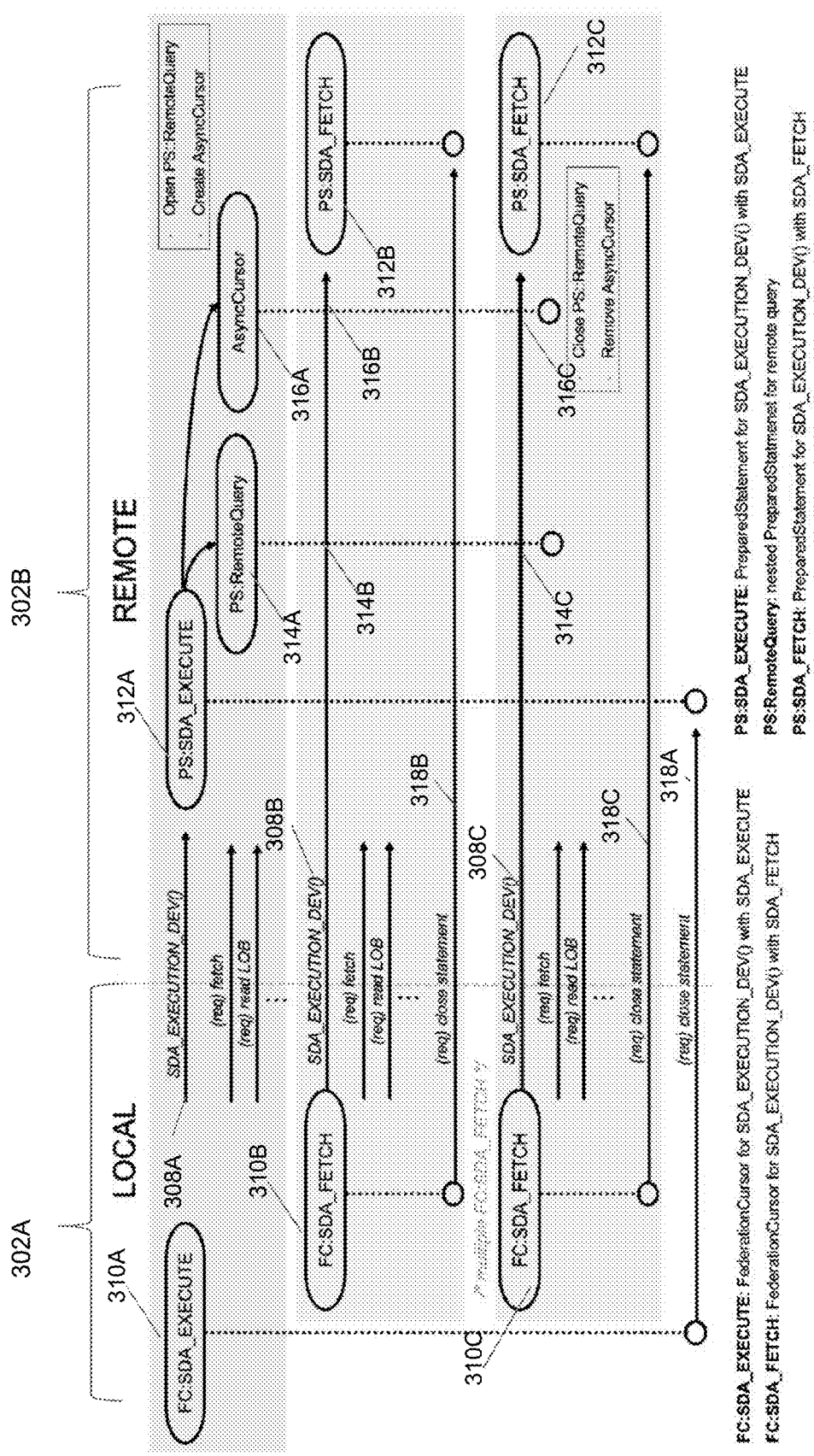
FIG. 3 depicts another example of pipelined partial fetches between a local system and a remote system, in accordance with some embodiment.

FIG. 3 depicts another example of a local system 302A and a remote system 302B, in accordance with some embodiments. The process at FIG. 3 is similar to the process depicted at FIG. 2 but the process of FIG. 3 shows among other things additional details with respect to the nested or asynchronous operations to provide the plurality of partial fetches while maintaining cursor information across the fetches.

In the example of FIG. 3, a parent smart data access operation (labeled SDA_Execution) 308A is depicted and a corresponding plurality of child smart data access operations (labeled SDA_Fetch) 308B-C. FIG. 3 also depicts a federation cursor 310A for the parent smart data access operation 308A, a second federation cursor 310B for the child smart data access operation 308B, and a third federation cursor 310C for the child smart data access operation 308C. In the example of FIG. 3, the second and third cursors 310B and 310C are configured as held open, so they do not close when the child smart data access operations 308B and 308C respectively complete their transactions. In this way, the federated cursors 310A-C are able to keep the status of the partial fetches across the all of the smart data access operations (labeled SDA_Execution) 308A-C. In other words, the federated cursors 310A-C keep their status or metadata regarding where in the process the fetches are until the parent smart data access operation 308A is completed.

At the remote system 302B, there is shown a prepared statement for the smart data execute (SDA_Exectute) 312A (which can be handled by a Federated Query Handler 210), prepared statement for the remote query 314A, and an asynchronous cursor 316A. The remote query 314A may executed nested N (multiple) fetches 314B-C to query for chunks of a database table. And the asynchronous cursor 316A remains open to obtain or maintain cursor information for the nested child cursors 316B-C.

In some implementations, the cursors 316A-C can be closed when the last SDA_EXECUTION_DEV( ) with SDA_FETCH consumes all of the result set. The first cursor and result set (312A, 314A and 316A) are kept until the end of fetch. As the cursors 312B-C generate partial results from the result set 314A, its corresponding federation cursor 310B-C is closed when all the its partial result is fetched. Then, 318B-C closes the cursor at remote system. Alternatively, or additionally, the cursors 316A-C can be closed when an asynchronous when the SDA_EXECUTION_DEV( ) with SDA_CLOSE is executed. When something happens in local so Federation Query Executor aborts, it sends SDA_EXECUTION_DEV( ) with SDA_CLOSE to clean up the corresponding asynchronous cursor(s) in remote. Alternatively, or additionally, the cursors 316A-C can be closed when an asynchronous when the remote connection is closed. If the remote connection is closed unexpectedly, the related asynchronous cursor(s) will be closed by connection close callback.

In the case of a dangling cursor for the asynchronous execution framework (which uses nested statements) for the query of the remote system to obtain the partial chunks of a table, for example, as a nested statement belongs to a parent procedure, the nested statement is closed automatically when the parent procedure is closed. As a result, there is need to consider a statement leak unless a federation cursor is leaked in the local system. However, an asynchronous cursor can be leaked if Federated Query Executor 210 does not (or misses) sending a close (e.g., SDA_CLOSE) for a variety of reasons (e.g., out of memory error, network error, and/or other type of error or event). To avoid a dangling cursor, a cursor timer may be used to find such dangling asynchronous cursor. For example, the cursor timer may be set to a threshold time, such that when the threshold time is reached, the Federated Query Executor can close a remote connection to the local system and/or close or clear a corresponding asynchronous cursor (which may be mapped to that connection).

In some embodiments, an initial request may be received (e.g., from a system or other device) to request the pipelined smart data access having the partial fetches disclosed herein. Referring again to the example of FIG. 3, an SDA_REQUEST JSON request 310A for the first SDA_EXECUTION_DEV( ) may contain a remote query string (e.g., select table X) and a fetch memory size that is used as a hint for a size of intermediate (or partial) fetch results. The first SDA_EXECUTION_DEV( ) 308A opens a nested prepared statement (PS), such as SDA_Execute 312A, which then executes a remote query 314A (e.g., for the given query of table X) using the partial fetches via 212B-C. In the example of FIG. 3, the remote system 302 may include a serializer, which may be used to fetch a chunk of the queried table (e.g., a given amount of result rows from a database table) according to the given fetch memory size.

In some embodiments, the first SDA_EXECUTION_DEV( ) 308A may consume all of the result of the nested statement(s), in which case there is no subsequent SDA_EXECUTION_DEV( ) 308B or C. However, when not all the rows are fetched by the SDA_EXECUTION_DEV( ) 308A, a serializer (at the remote system) may be used to fetch a certain amount of rows instead of materializing all of the rows, and then the serializer generates chunks as LOBs. With respect to the asynchronous cursor, the asynchronous cursor may store context information, such as a connection id and a statement id. The Federated Query Executor may generate a partial table by fetching a chunk LOB(s) from the corresponding federation cursor. If all the LOBs are fetched but there are more rows left in the table (e.g., database table X being fetched), subsequent SDA_EXECUTION_DEV( ) may take place with a different request type, such as an SDA_FETCH. The subsequent SDA_EXECUTION_DEV( ) can find the asynchronous cursor by the cursor id from the connection-wise map. The actual nested statement object can be retrieved by the statement id stored in the asynchronous cursor. The nested statement will be valid unless its parent procedure (the prepared statement for SDA_EXECUTION_DEV( ) with SDA_EXECUTE request⇒PS:SDA_EXECUTE) is alive (which is a reason why the corresponding federation cursor (FC:SDA_EXECUTE) be opened). As the current federation cursor does not support re-execution of prepared statement with a different parameter, a new one is opened for every SDA_FETCH/SDA_CLOSE.

In some implementations, if the local system 202A/302A triggers a failure (e.g., OOM, etc.), the local system may inform the corresponding asynchronous cursor in the remote system. For the purpose, Federation Query Executor executes SDA_EXECUTION_DEV( ) with SDA_CLOSE request.

In some embodiments, the remote system 202/302 may choose among a plurality of transfer modes, such as a binary transfer, a full fetch of the database table, a pipelined partial fetch (which may be row-wise down through the database table being fetched).

Figure 4:
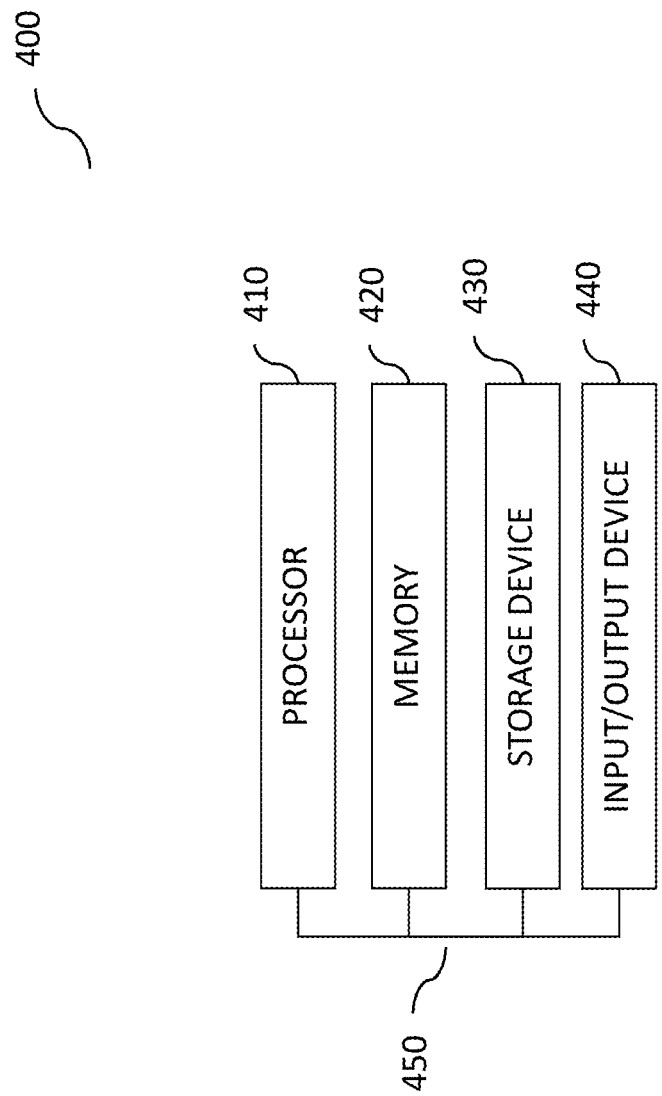
FIG. 4 depicts another example of a system, in accordance with some embodiments.

In some implementations, the current subject matter may be configured to be implemented in a system 400, as shown in FIG. 4. For example, the third party system 180, databases 102A-C, and/or other aspects disclosed herein may be at least in part physically comprised on system 400. To illustrate further system 400 may further an operating system, a hypervisor, and/or other resources, to provide virtualize physical resources (e.g., via virtual machines). The system 400 may include a processor 410, a memory 420, a storage device 430, and an input/output device 440. Each of the components 410, 420, 430 and 440 may be interconnected using a system bus 450. The processor 410 may be configured to process instructions for execution within the system 400. In some implementations, the processor 410 may be a single-threaded processor. In alternate implementations, the processor 410 may be a multi-threaded processor.

The processor 410 may be further configured to process instructions stored in the memory 420 or on the storage device 430, including receiving or sending information through the input/output device 440. The memory 420 may store information within the system 400. In some implementations, the memory 420 may be a computer-readable medium. In alternate implementations, the memory 420 may be a volatile memory unit. In yet some implementations, the memory 420 may be a non-volatile memory unit. The storage device 430 may be capable of providing mass storage for the system 400. In some implementations, the storage device 430 may be a computer-readable medium. In alternate implementations, the storage device 430 may be a floppy disk device, a hard disk device, an optical disk device, a tape device, non-volatile solid state memory, or any other type of storage device. The input/output device 440 may be configured to provide input/output operations for the system 400. In some implementations, the input/output device 440 may include a keyboard and/or pointing device. In alternate implementations, the input/output device 440 may include a display unit for displaying graphical user interfaces.

Figure 5:
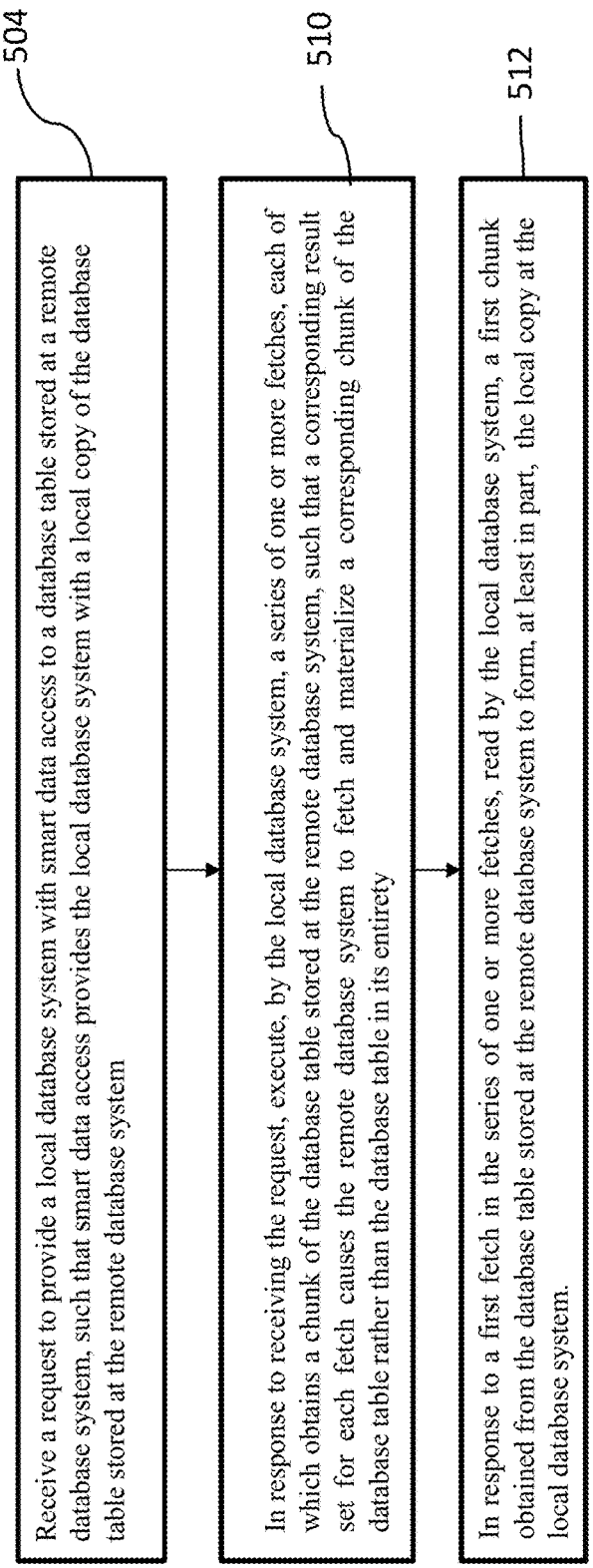
FIG. 5 depicts an example of a process for pipelined fetches in connection with smart data access, in accordance with some embodiments.

FIG. 5 depicts an example of a process for pipelined fetches with a smart data access, in accordance with some embodiments.

At 504, a request is received to provide a local database system with smart data access to a database table stored at a remote database system, such that smart data access provides the local database system with a local copy of the database table stored at the remote database system, in accordance with some example embodiments. For example, the federated data executor 206 (FIG. 2) may receive a request from a local system 202A to provide smart data access to a database table X 204B stored at the remote system 202B. This smart data access provides the local database system with a local copy of the database table stored at the remote database system, In some embodiments, the request indicates that the smart data access should be provided using pipelined fetches as disclosed herein. For example, the federated data executor 206 may support various modes of obtaining the local copy of the remote database table, so the request may specifically indicate the pipelined fetches as disclosed herein.

At 510, in response to receiving the request at 504, the local database system may execute a series of one or more fetches, each of which obtains a chunk of the database table stored at the remote database system, such that a corresponding result set for each fetch causes the remote database system to fetch and materialize a corresponding chunk of the database table rather than the database table in its entirety, in accordance with some example embodiments. For example, the local system 202A may, in response to receiving the request at 505, execute a series of one or more fetches, such as fetches 208B, D, and so forth to obtain chunks of database table X 204B.

At 512, in response to a first fetch in the series of one or more fetches, reading, by the local database system, a first chunk obtained from the database table stored at the remote database system to form, at least in part, the local copy at the local database system, in accordance with some example embodiments. For example, the local system 202A may, in response to receiving the request at the fetches at 510, read at 208C each of the chunks.

In some embodiments, the local database system may provide to the remote database system metadata indicating at least a maximum size of the chunks fetches at 212B and C for example.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system comprising: at least one processor; and at least one memory including code which when executed by the at least one processor causes operations comprising: receiving a request to provide a local database system with smart data access to a database table stored at a remote database system, such that smart data access provides the local database system with a local copy of the database table stored at the remote database system; in response to receiving the request, executing, by the local database system, a series of one or more fetches, each of which obtains a chunk of the database table stored at the remote database system, such that a corresponding result set for each fetch causes the remote database system to fetch and materialize a corresponding chunk of the database table rather than the database table in its entirety; and in response to a first fetch in the series of one or more fetches, reading, by the local database system, a first chunk obtained from the database table stored at the remote database system to form, at least in part, the local copy at the local database system.

Example 2: The computer-implemented method of Example 1 further comprising: providing, by the local database system, metadata to the remote database system, wherein the metadata indicates at least a maximum size of the chunk to be obtained from the database table stored at the remote database system.

Example 3: The computer-implemented method of Examples 1-2 further comprising: in response to a second fetch in the series of one or more fetches, reading, by the local database system, a second chunk obtained from the database table stored at the remote database system to form, at least in part, the local copy at the local database system.

Example 4: The computer-implemented method of Examples 1-3 further comprising: checking, by the local database system, whether the remote database system supports pipelined fetches.

Example 5: The computer-implemented method of Examples 1-4, wherein in response to the remote database system supporting the pipelined fetches, the local database system executes the series of one or more fetches.

Example 6: The computer-implemented method of Examples 1-5, wherein the local database system includes a federated query executor and the remote database system includes a federated query handler, the federated query executor and the federated query hander working together to execute the series of one or more fetches.

Example 7: The computer-implemented method of Examples 1-6, further comprising: receiving, by the federated query executor, an indication from a cursor function at the federated query handler, the indication providing an amount remaining in the database table to be fetched via the corresponding chunks.

Example 8: The computer-implemented method of Examples 1-7, wherein each of the one or more fetches is configured to have a size below a threshold size.

Example 9: The computer-implemented method of Examples 1-8, wherein the threshold size is configured by the local database system as part of a procedure to execute at the remote database system the series of one or more fetches.

Example 10: The computer-implemented method of Examples 1-9, wherein the local database system and the remote database system are each an in-memory database that materialize a corresponding chunk of the database table rather than the database table in its entirety.

Example 11: A system comprising: at least one processor; and at least one memory including code which when executed by the at least one processor causes operations comprising: receiving a request to provide a local database system with smart data access to a database table stored at a remote database system, such that smart data access provides the local database system with a local copy of the database table stored at the remote database system; in response to receiving the request, executing, by the local database system, a series of one or more fetches, each of which obtains a chunk of the database table stored at the remote database system, such that a corresponding result set for each fetch causes the remote database system to fetch and materialize a corresponding chunk of the database table rather than the database table in its entirety; and in response to a first fetch in the series of one or more fetches, reading, by the local database system, a first chunk obtained from the database table stored at the remote database system to form, at least in part, the local copy at the local database system.

Example 12: The system of Example 11 further comprising: providing, by the local database system, metadata to the remote database system, wherein the metadata indicates at least a maximum size of the chunk to be obtained from the database table stored at the remote database system.

Example 13: The system of Example 11-12 further comprising: in response to a second fetch in the series of one or more fetches, reading, by the local database system, a second chunk obtained from the database table stored at the remote database system to form, at least in part, the local copy at the local database system.

Example 14: The system of Example 11-13 further comprising: checking, by the local database system, whether the remote database system supports pipelined fetches.

Example 15: The system of Example 11-14, wherein in response to the remote database system supporting the pipelined fetches, the local database system executes the series of one or more fetches.

Example 16: The system of Example 11-15, wherein the local database system includes a federated query executor and the remote database system includes a federated query handler, the federated query executor and the federated query hander working together to execute the series of one or more fetches.

Example 17: The system of Example 11-16, further comprising: receiving, by the federated query executor, an indication from a cursor function at the federated query handler, the indication providing an amount remaining in the database table to be fetched via the corresponding chunks.

Example 18: The system of Example 11-17, wherein each of the one or more fetches is configured to have a size below a threshold size, and wherein the threshold size is configured by the local database system as part of a procedure to execute at the remote database system the series of one or more fetches.

Example 19: The system of Example 11-18, wherein the local database system and the remote database system are each an in-memory database that materialize a corresponding chunk of the database table rather than the database table in its entirety.

Example 20: A non-transitory computer-readable storage medium including code which when executed by at least one processor causes operations comprising: receiving a request to provide a local database system with smart data access to a database table stored at a remote database system, such that smart data access provides the local database system with a local copy of the database table stored at the remote database system; in response to receiving the request, executing, by the local database system, a series of one or more fetches, each of which obtains a chunk of the database table stored at the remote database system, such that a corresponding result set for each fetch causes the remote database system to fetch and materialize a corresponding chunk of the database table rather than the database table in its entirety; and in response to a first fetch in the series of one or more fetches, reading, by the local database system, a first chunk obtained from the database table stored at the remote database system to form, at least in part, the local copy at the local database system.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
   receiving a request to provide a local database system with smart data access to a database table stored at a remote database system, such that the smart data access provides the local database system with a local copy of the database table stored at the remote database system, wherein the request comprises a remote query string that identifies the database table stored at the remote database system and a maximum size for one or more partial fetches;
   in response to receiving the request, executing, by a query executor of the local database system, a series of the one or more partial fetches towards a query handler of the remote database system, each partial fetch of the one or more partial fetches causes the query handler of the remote database system to obtain and store in cache a chunk of the database table stored at the remote database system for reading by the query executor, wherein the chunk is less than or equal to the maximum size indicated by the request, and wherein the query handler materializes each chunk of the corresponding chunks without materializing all of the database table at the remote database system; and in response to a first partial fetch in the series of one or more partial fetches, reading, by the query executor of the local database system, a first chunk obtained by the query handler from the database table, wherein the first chunk provides, at the local database system, at least in part, the local copy of the database table for the smart data access.

2. The computer-implemented method of claim 1 further comprising: in response to a second partial fetch in the series of one or more partial fetches, reading, by the local database system, a second chunk obtained from the database table stored at the remote database system to form, at least in part, the local copy at the local database system.

3. The computer-implemented method of claim 1 further comprising: checking, by the local database system, whether the remote database system supports pipelined partial fetches.

4. The computer-implemented method of claim 3, wherein in response to the remote database system supporting the pipelined partial fetches, the local database system executes the series of one or more partial fetches.

5. The computer-implemented method of claim 1, wherein the query executor comprises a federated query executor and the query handler comprises a federated query handler, the federated query executor and the federated query handler working together to execute the series of one or more partial fetches.

6. The computer-implemented method of claim 5, further comprising: receiving, by the federated query executor, an indication from a cursor function at the federated query handler, the indication providing an amount remaining in the database table to be fetched via corresponding chunks.

7. The computer-implemented method of claim 1, wherein each partial fetch of the one or more partial fetches is configured to have a size below a threshold size.

8. The computer-implemented method of claim 7, wherein the threshold size is configured by the local database system as part of a procedure to execute at the remote database system the series of one or more partial fetches.

9. The computer-implemented method of claim 1, wherein the local database system and the remote database system are in-memory database.

10. A system comprising:
at least one processor; and at least one memory including code which when executed by the at least one processor causes operations comprising:
receiving a request to provide a local database system with smart data access to a database table stored at a remote database system, such that the smart data access provides the local database system with a local copy of the database table stored at the remote database system, wherein the request comprises a remote query string that identifies the database table stored at the remote database system and a maximum size for one or more partial fetches;
in response to receiving the request, executing, by a query executor of the local database system, a series of the one or more partial fetches towards a query handler of the remote database system, each partial fetch of the one or more partial fetches causes the query handler of the remote database system to obtain and store in cache a chunk of the database table stored at the remote database system for reading by the query executor, wherein the chunk is less than or equal to the maximum size indicated by the request, and wherein the query handler materializes each chunk of the corresponding chunks without materializing all of the database table at the remote database system; and in response to a first partial fetch in the series of one or more partial fetches, reading, by the query executor of the local database system, a first chunk obtained by the query handler from the database table, wherein the first chunk provides, at the local database system, at least in part, the local copy of the database table for the smart data access.

11. The system of claim 10 further comprising: in response to a second partial fetch in the series of one or more partial fetches, reading, by the local database system, a second chunk obtained from the database table stored at the remote database system to form, at least in part, the local copy at the local database system.

12. The system of claim 10 further comprising: checking, by the local database system, whether the remote database system supports pipelined partial fetches.

13. The system of claim 12, wherein in response to the remote database system supporting the pipelined partial fetches, the local database system executes the series of one or more partial fetches.

14. The system of claim 10, wherein the query executor comprises a federated query executor and the query handler comprises a federated query handler, the federated query executor and the federated query handler working together to execute the series of one or more partial fetches.

15. The system of claim 14, further comprising: receiving, by the federated query executor, an indication from a cursor function at the federated query handler, the indication providing an amount remaining in the database table to be fetched via corresponding chunks.

16. The system of claim 10, wherein each partial fetch of the one or more partial fetches is configured to have a size below a threshold size, and wherein the threshold size is configured by the local database system as part of a procedure to execute at the remote database system the series of one or more partial fetches.

17. The system of claim 10, wherein the local database system and the remote database system are in-memory database.

18. A non-transitory computer-readable storage medium including code which when executed by at least one processor causes operations comprising:
receiving a request to provide a local database system with smart data access to a database table stored at a remote database system, such that the smart data access provides the local database system with a local copy of the database table stored at the remote database system, wherein the request comprises a remote query string that identifies the database table stored at the remote database system and a maximum size for one or more partial fetches;
in response to receiving the request, executing, by a query executor of the local database system, a series of the one or more partial fetches towards a query handler of the remote database system, each partial fetch of the one or more partial fetches causes the query handler of the remote database system to obtain and store in cache a chunk of the database table stored at the remote database system for reading by the query executor, wherein the chunk is less than or equal to the maximum size indicated by the request, and wherein the query handler materializes each chunk of the corresponding chunks without materializing all of the database table at the remote database system; and in response to a first partial fetch in the series of one or more partial fetches, reading, by the query executor of the local database system, a first chunk obtained by the query handler from the database table, wherein the first chunk provides, at the local database system, at least in part, the local copy of the database table for the smart data access.

* * * * *